US009374028B2

(12) United States Patent
Nondahl et al.

(10) Patent No.: US 9,374,028 B2
(45) Date of Patent: Jun. 21, 2016

(54) TRANSITION SCHEME FOR POSITION SENSORLESS CONTROL OF AC MOTOR DRIVES

(71) Applicant: Rockwell Automation Technologies, Inc., Mayfield Heights, OH (US)

(72) Inventors: Thomas Nondahl, Greenfield, WI (US); Jingbo Liu, Grafton, WI (US); Peter Schmidt, Franklin, WI (US); Semyon Royak, Orange Village, OH (US); Jingya Dai, Kitchener (CA); Ehsan Al-Nabi, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/565,781

(22) Filed: Dec. 10, 2014

(65) Prior Publication Data

US 2016/0056740 A1 Feb. 25, 2016

Related U.S. Application Data

(60) Provisional application No. 62/040,887, filed on Aug. 22, 2014.

(51) Int. Cl.
*H02P 6/04* (2016.01)
*H02P 6/18* (2016.01)
*H02P 6/20* (2016.01)

(52) U.S. Cl.
CPC ............... *H02P 6/181* (2013.01); *H02P 6/182* (2013.01); *H02P 6/205* (2013.01)

(58) Field of Classification Search
USPC ............... 318/400.09, 400.1, 400.12, 400.13, 318/400.14
See application file for complete search history.

(56) References Cited

U.S. PATENT DOCUMENTS

| 3,723,840 | A | 3/1973 | Opal et al. |
| 4,823,251 | A | 4/1989 | Kawabata et al. |
| 5,744,921 | A | 4/1998 | Makaran |
| 5,909,098 | A | 6/1999 | Konecny et al. |
| 5,959,431 | A | 9/1999 | Xiang |
| 5,994,869 | A | 11/1999 | Bacerra |

(Continued)

FOREIGN PATENT DOCUMENTS

| CN | 2513286 Y | 9/2002 |
| CN | 201504207 U | 6/2010 |

(Continued)

OTHER PUBLICATIONS

Kim et al., "PWM Switching Frequency Signal Injection Sensorless Methods in IPMSM", IEEE, 2011, pp. 3021-3028.
Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

(Continued)

*Primary Examiner* — Eduardo Colon Santana
*Assistant Examiner* — Iftekhar Mustafa
(74) *Attorney, Agent, or Firm* — Fay Sharpe LLP

(57) ABSTRACT

Motor drive control apparatus and methods are presented for sensorless control of a driven motor using open loop current regulated control during low-speed operation and an EMF-based position observer for position estimation during higher speed operation, with zero feedback speed during low-speed open-loop operation and feedback speed estimated by the EMF-based observer during high-speed operation and with velocity mode control over the full speed range and mode control hysteresis for smooth transitions between open loop and EMF-based observer control.

20 Claims, 9 Drawing Sheets

(56) References Cited

U.S. PATENT DOCUMENTS

| | | | |
|---|---|---|---|
| 6,121,736 | A | 9/2000 | Narazaki et al. |
| 6,124,697 | A | 9/2000 | Wilkerson |
| 6,208,537 | B1 | 3/2001 | Skibinski et al. |
| 6,329,781 | B1 | 12/2001 | Matsui et al. |
| 6,940,249 | B2 | 9/2005 | Toyoda |
| 7,045,988 | B2 | 5/2006 | Ha et al. |
| 7,102,323 | B2 | 9/2006 | Zhou et al. |
| 7,679,308 | B2 | 3/2010 | Tomigashi |
| 7,724,549 | B2 | 5/2010 | Skibinski et al. |
| 7,729,146 | B2 | 6/2010 | Hayami et al. |
| 7,979,223 | B2 | 7/2011 | Monti et al. |
| 7,990,097 | B2 | 8/2011 | Cheng et al. |
| 8,009,450 | B2 | 8/2011 | Royak et al. |
| 8,217,602 | B2 | 7/2012 | Ikei |
| 8,288,886 | B2 | 10/2012 | Anwar et al. |
| 8,736,220 | B2 | 5/2014 | Ogawa et al. |
| 8,981,702 | B2 * | 3/2015 | Katariya ............ H02P 21/0003 318/400.01 |
| 2006/0113952 | A1 | 6/2006 | Zhou |
| 2007/0007929 | A1 | 1/2007 | Lee et al. |
| 2008/0074074 | A1 | 3/2008 | Skibinski et al. |
| 2008/0312855 | A1 | 12/2008 | Monti et al. |
| 2009/0146592 | A1 | 6/2009 | Tobari et al. |
| 2009/0153083 | A1 * | 6/2009 | Rozman ................ H02P 23/14 318/400.06 |
| 2011/0062908 | A1 | 3/2011 | Kitanaka |
| 2011/0109155 | A1 | 5/2011 | Anwar et al. |
| 2011/0181232 | A1 * | 7/2011 | Krishnamoorthy ...... H02P 6/06 318/811 |
| 2014/0197774 | A1 | 7/2014 | Liu et al. |
| 2014/0312811 | A1 | 10/2014 | Liu et al. |

FOREIGN PATENT DOCUMENTS

| | | |
|---|---|---|
| CN | 101950983 A | 1/2011 |
| CN | 202872721 (U) | 4/2013 |
| EP | 1635448 A1 | 3/2006 |
| JP | 2001-025282 | 1/2001 |
| WO | WO2009093214 A2 | 7/2009 |

OTHER PUBLICATIONS

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kobayashi et al., "Investigation of IPMSM's Position Estimation in Low Speed Region with DC Link Current Detection", IEEE Jan. 2007, pp. 1411-1416.

Miranda et al., "Parameter and Speed Estimation for Implementing Low Speed Sensorless PMSM Drive System Based on an Algebraic Method"; Applied Power Electronics Conf.; APEC 2007, 22$^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; 32$^{nd}$ Annual Conf., IEEE; Piscataway, NJ; Nov. 1, 2006; pp. 5069-5074.

Yim et al., "A Predictive Current Control Associated to EKF for High Performance IPMSM Drives"; Applied Power Electronics Conf. and Exposition (APEC), 2011; 26$^{th}$ Annual IEEE, Mar. 6, 2011; pp. 1010-1016.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Carpaneto, et al., "A New Sensorless Permanent Magnet Synchronous Motor Algorithm Based on Algebraic Method"; 13$^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

"Guidelines For The Use Of 400-600 Volt AC Drives In Medium Voltage Applications," Yaskawa Application Note, Jun. 7, 2005.

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE 13$^{th}$ Int'l Conf. on Optimization of Electrical and Electronic Equipment (OPTIM), May 2012, pp. 432-438.

Batzel, Todd D. et al., "*Electric Propulsion With Sensorless Permanent Magnet Synchronous Motor: Implementation And Performance*", IEEE Transactions on Energy Conversion, vol. 20, No. 3, pp. 575-583, Sep. 2005.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique To Actively Damp Oscillation In The Input LC Filter Of Three-Phase PWM Rectifier", Electrical Engineering/Electronics, Computer, Telecommunications and Information Technology, 2008; Proceedings of ECTI-CON 2008; pp. 1017-1020.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "*Analysis of Multiloop Control Strategies for LC/CL/LCL-Filtered Voltage-Source And Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Mukherjee et al., "Fast Control of Filter For Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.

(56) References Cited

OTHER PUBLICATIONS

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., *"Sensorless Control Of Induction Motor Drives Equipped With Inverter Output Filter"*, IEEE Transactions on Industrial Electronics, vol. 53, No. 4, pp. 1188-1197, Aug. 2006.

Salomäki, J. et al., *"Sensorless Vector Control Of PMSM Drives Equipped With Inverter Output Filter"*, in Proceedings of the $32^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

U.S. Appl. No. 13/931,839, filed Jun. 29, 2013, entitled "Method And Apparatus For Stability Control of Open Loop Motor Drive Operation", to Liu et al.

U.S. Appl. No. 14/193,329, filed Feb. 28, 2014, entitled "Method And Apparatus For Stability Control of Open Loop Motor Drive Operation", to Rowan et al.

* cited by examiner

TRANSITION SCHEME FOR POSITION SENSORLESS CONTROL OF AC MOTOR DRIVES

REFERENCE TO RELATED APPLICATION

This application claims priority to, and the benefit of, U.S. Provisional Patent Application Ser. No. 62/040,887, filed Aug. 22, 2014, and entitled TRANSITION SCHEME FOR POSITION SENSORLESS CONTROL OF AC MOTOR DRIVES, the entirety of which application is hereby incorporated by reference.

BACKGROUND

Sensorless motor drives are used in a variety of applications, particularly where providing position and/or speed sensors directly at a motor load is difficult or impractical. In certain applications, a step-up transformer may be used to boost the motor drive output voltage, allowing use of a low-voltage drive to power a medium voltage induction motor, and/or to reduce $I^2R$ losses and facilitate use of a smaller diameter cable wire for long cable runs between the motor drive and the driven motor. Certain applications also employ sine wave filters, such as LC filters to suppress reflected wave voltage spikes associated with pulse width modulated (PWM) variable frequency drives. Use of sensorless voltage-frequency control techniques, however, may lead to problems, particularly where a transformer and/or sine wave filter is connected between the motor drive and the motor load. Conventional sensorless field-oriented-control (FOC) or other open loop speed control techniques have thus been found generally unsuitable for low-speed motor drive operation where output filters and transformers are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, the driven motor may be unable to successfully start from a stopped condition due to unstable motor speed oscillations. Thus, improved techniques and motor drives are needed for sensorless motor speed control.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides motor drive control techniques and apparatus for transitioning from low-speed open loop current regulated control and higher speed EMF-based position estimation control. The disclosed techniques and apparatus find particular utility in sensorless motor drives for permanent magnet motor electric submersible pump (ESP) and/or PCP pump applications with a sign wave filter and a transformer between the inverter output of a motor drive and a driven motor. However, the disclosed concepts are applicable to other sensorless motor drive systems generally and provide significant advantages over previous attempts at current/frequency control during startup and observer-based sensorless control for single phase brushless DC permanent magnet motors and reluctance synchronous motors. The use of low-speed current regulated open loop control and high-speed EMF sensorless control is facilitated by transition techniques for the commutation position value between low-speed open loop and high-speed EMF-based position estimation without requiring any tuning. These techniques may be employed in connection with speed or velocity regulation to minimize undesirable transients, with current references being generated without switching between the speed regulator output and open loop current references in order to facilitate smooth transitions. Moreover, the present apparatus requires no tuning, unlike other approaches involving current-frequency to active flux sensorless control transitions, as well as subsequent transitions to current-frequency, and back to active flux sensorless control which involve multiple transitions and require tuned first-order lag compensators having zero input.

Methods are provided for sensorless motor speed control, including generating a first position command signal or value (open loop position signal or value) using an open loop frequency command, and generating an estimated position signal or value using an EMF-based position estimator at least partially according to the inverter output current signals or values and the inverter output voltage signals or values. The methods further involve generating command signals or values for pulse width modulation operation of the inverter using a speed controller at least partially according to a desired speed signal or value, a feedback speed signal or value, and a selected commutation position signal or value, and setting the selected commutation position signal or value to the open loop position signal or value in a first mode for a first range of speeds or to the estimated position signal or value in a second mode for a second higher range of speeds at least partially according to the desired speed signal or value. The methods may further include setting the feedback speed signal or value to a fixed value, such as zero, for open loop control in the first mode for the first range of speeds, and computing the feedback speed signal or value according to the commutation position signal or value generated using the EMF-based position estimator for closed loop control in the second mode for the second speed range.

In certain embodiments, hysteresis may be employed in transitioning between the first and second modes where the first range and the second range overlap, including switching from the first mode to the second mode when an absolute value of the desired speed signal or value exceeds a first threshold, and switching from the second mode to the first mode when the absolute value of the desired speed signal or value is less than a second threshold, the second threshold being lower than the first threshold.

In certain embodiments, the open loop and estimated position signals or values are blended to compute the selected commutation position signal or value for transitioning from the first mode to the second mode, for example, so as to provide a smooth transition of the selected commutation position signal or value.

In various embodiments, moreover, an integrator of the open loop current regulated controller is preset to the estimated position signal or value for transitioning from the second mode to the first mode.

Further aspects of the disclosure provide motor drive control apparatus configured to implement the methods, as well as computer readable mediums programmed with computer executable instructions for implementing one or more of the methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
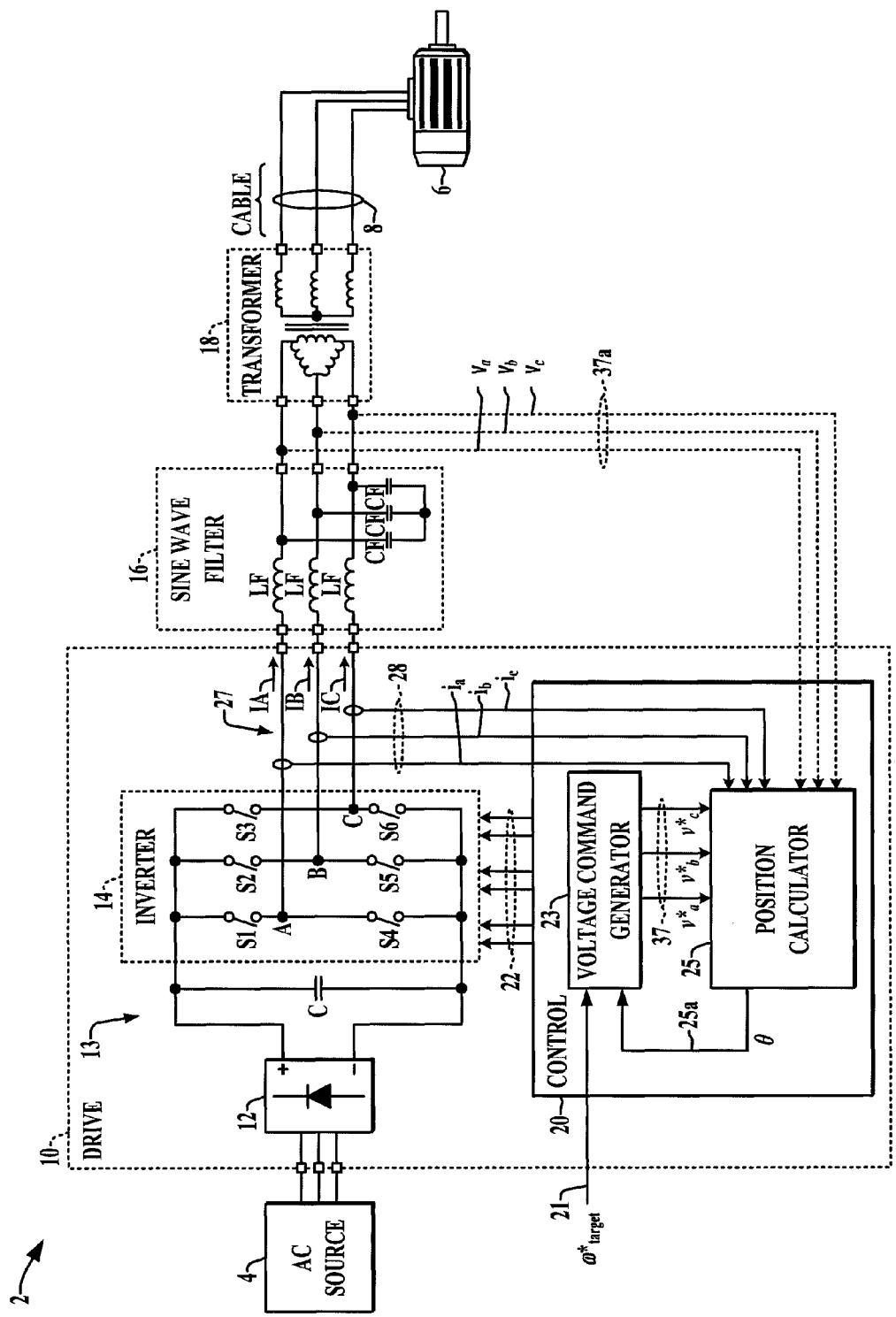
FIG. 1 is a schematic diagram illustrating a motor drive embodiment for sensorless motor speed control using a dual mode position calculator providing a position signal or value to a voltage command generator according to one or more aspects of the present disclosure.
Figure 2:
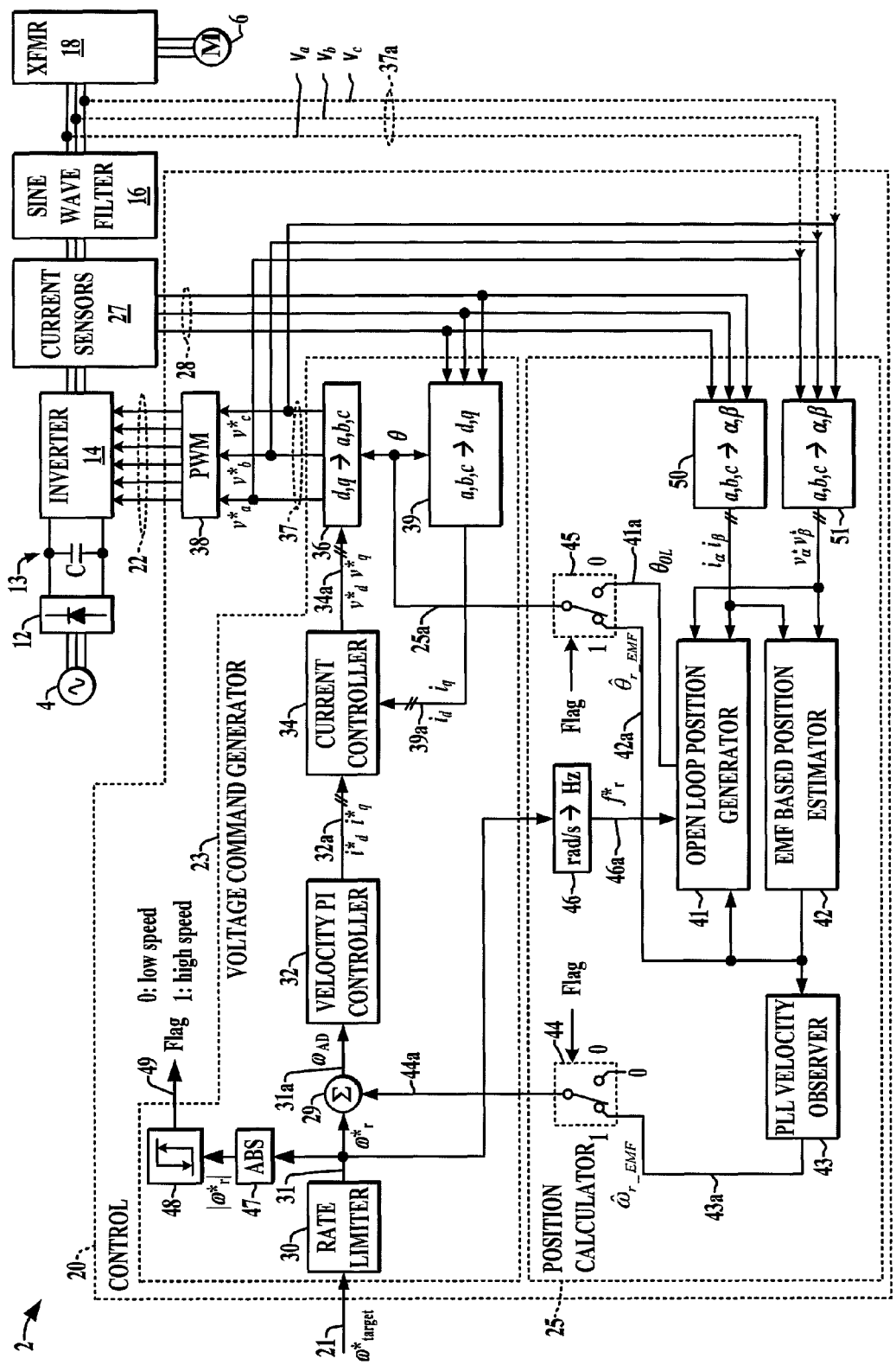
FIG. 2 is a schematic diagram illustrating further details of the motor drive embodiment of FIG. 1.

Referring initially to FIGS. 1 and 2, several embodiments or implementations are hereinafter described in conjunction with the drawings, wherein like reference numerals are used to refer to like elements throughout, and wherein the various features are not necessarily drawn to scale. Methods and motor drive apparatus 10 are presented for sensorless or open loop motor speed control using position command information, such as a signal or value, calculated via an open loop position generator 41 for a first low-speed range of operation and via an EMF-based position estimator 42 for a higher second range of operation, in which a position calculator component 25 of the motor drive controller 20 provides a given commutation position 25a (θ) to a voltage command generator 23 for use in pulse width modulated operation of a motor drive inverter 14. The control techniques and motor drives may be used in a variety of applications, including without limitation driving electric submersible pumps, whether including an induction motor or a permanent magnet synchronous motor (PMSM), and may be employed in situations in which the motor drive is directly connected to the driven motor or where one or more intervening components (e.g., sine wave filters and/or transformers) are connected between the output inverter and the driven motor. In addition, the concepts of the present disclosure may be employed in conjunction with any suitable form of control command algorithm, including without limitation voltage-frequency and/or current-frequency control, using any suitable internal closed loop feedback regulation configuration (e.g., proportional-integral or PI control components). In this regard, while illustrated and described in various exemplary embodiments below, the various aspects of the present disclosure may be used in a wide variety of motor drive applications, motor drive controller architectures, etc., and the various concepts are not limited by the illustrated embodiments.

FIG. 1 illustrates a motor drive system 2 including a motor drive 10 in a sensorless or open loop speed control configuration without direct measurement of the motor speed or position. While these circumstances are common in remotely driven motor situations (e.g., submersible pump applications, etc.), the various control aspects of the present disclosure may also be employed in systems in which the actual motor speed is directly measured and feedback signals are provided to the motor drive controller. As shown in FIG. 1, the system 2 includes an AC power source 4 providing single or multiphase power (e.g., 480 V AC, 50 or 60 Hz) to a motor drive power converter 10 including one or more power conversion stages with an inverter 14 providing single phase or multiphase AC output currents (e.g., three-phase output currents IA, IB and IC in the illustrated example) to drive a motor load 6. The motor load 6 may be directly driven by the output of the motor drive inverter 14, or one or more intervening circuits may be connected between the inverter 14 and the motor load 6, such as one or both of a sine wave filter 16 and/or a transformer 18 and a potentially lengthy cable 8 as illustrated in FIG. 1.

The drive 10 includes an active or passive rectifier 12 providing rectification of the received (e.g., three-phase) AC input power to create a DC bus voltage across a DC link circuit 13 including a capacitance C. Any suitable form of rectifier 12 can be used, including without limitation a passive rectifier (e.g., one or more rectifier diodes), or a switching rectifier operating at or near the fundamental frequency of the AC input source (fundamental front end or FFE) or at a higher and possibly variable switching frequency, such as an active front end (AFE) rectifier that performs additional functions such as power factor correction, etc.

The DC link circuit 13 provides a DC input voltage to a switching inverter 14, in this case including switching devices S1, S2, S3, S4, S5 and S6 operated according to inverter switching control signals 22 from a controller 20 to convert the DC power to provide the AC output currents IA, IB and IC for directly or indirectly driving the motor load 6 (e.g., through an intervening sine wave filter 16 and/or transformer 18. Although the illustrated inverter 14 provides a three-phase two-level output, other single or multiphase or multilevel output implementations are possible within the scope of the present disclosure. Any suitable inverter switching devices S1-S6 may be used, including without limitation insulated gate bipolar transistors (IGBTs), silicon controlled rectifiers (SCRs), gate turn-off thyristors (GTOs), integrated gate commutated thyristors (IGCTs), etc. The controller 20 and the elements and components thereof can include suitable logic or processor-based circuitry, and may also include signal level amplification and/or driver circuitry (not shown) to provide suitable drive voltage and/or current levels sufficient to selectively actuate the switching devices S1-S6 based on voltage command from a voltage command generator 23 using commutation position information such as a signal or value 25a from a position calculator component 25. For example, the controller 20 may include comparators, carrier wave generators or digital logic/processor elements and signal drivers, etc. (not shown).

Moreover, the controller 20 can provide the switching control signals 22 according to any suitable pulse width modulation technique, including without limitation space vector modulation (SVM), carrier-based pulse width modulation, selective harmonic elimination (SHE), etc. In addition, the controller 20 implements various computational functions as detailed hereinafter and may include suitable analog to digital and digital to analog conversion components and processor-based or otherwise programmable logic circuitry alone or in combination with analog circuitry to perform various operations on signals or values as described herein. Furthermore, certain embodiments of the controller 20 may include processing elements and electronic memory for storage of data and program instructions by which the controller 20 may implement various methods and functions detailed herein in addition to understood motor control functions.

The system 2 in FIG. 1 further includes a sine wave or output filter 16, in one example, a three-phase LC filter having a series filter inductor LF in each output line, as well as a corresponding filter capacitor CF coupled between the corresponding phase line and a common connection point. Other output filter topologies may be used, such as LCL filters, CLC filters, etc. with one or more series elements and further filter elements (e.g., filter capacitors CF) connected in any suitable delta or Y configuration. The example of FIG. 1 also includes a transformer 18 between the filter 16 and the motor cable 8. The illustrated transformer 18 has a three phase delta-connected primary as well as a Y-connected secondary, although any suitable transformer primary and/or secondary winding configuration or topology may be used. Moreover, the transformer 18 may in certain embodiments be a step-up transformer. For example, a step-up transformer 18 may facilitate use of a low-voltage drive 10 to power a medium or high voltage motor 6, or allow use of a medium-voltage drive 10 to power a high-voltage motor 6. Also or in combination, a step-up transformer 18 may be useful to allow a reduction in the current levels carried by the cable 8, thereby facilitating use of smaller diameter cable wires in the cable 8. The cable 8, moreover, can be of any suitable construction for interfacing the motor drive output, the sine wave filter 16, and/or the transformer 18 with the leads of the motor 6.

The motor drive 10 and the controller 20 operate in sensorless fashion to control one or more operating parameters of the driven motor load 6. For example, the controller 20 provides the inverter switching control signals 22 in order to control position and/or speed and/or torque of the motor 6 without directly sensing any of these controlled parameters. For example, current sensors 27 are disposed at the output of the inverter 14 in FIGS. 1 and 2 to provide feedback signals or values 28 (e.g., $i_a$, $i_b$ and $i_c$) to the controller 20 which represent the inverter output currents IA, IB and IC, and/or from which the values of these output currents can be computed, derived or otherwise estimated. Any suitable current sensing devices 27 can be used to generate or provide the signals and/or values 28, and may provide analog signals 28 and/or the sensors 27 may be smart sensors providing digital values 28 representing the output currents IA, IB and IC generated at the output of the inverter 14.

The controller 20 uses the feedback signals or values 28 as well as one or more desired operating parameters to regulate or adjust the output currents IA, IB and IC. In addition, as shown in FIG. 2, the controller 20 may reuse voltage command signals or values 37 $v_a^*$, $v_b^*$ and $v_c^*$ generated by the voltage command generator component 23 as inputs for the position calculator component 25, or other embodiments are possible in which voltage signals or values 37a $v_a$, $v_b$ and $v_c$ may be sensed, such as at the output of the sine wave filter 16 as shown in dashed lines in FIG. 2, for use by the position calculator 25. In general, the control technique implemented by the illustrated controller 20 is essentially sensorless or open-loop with respect to the actual operating condition of the driven motor load 6 (e.g., speed and/or position), as there are no direct feedback signals obtained from the motor 6 itself. In the examples of FIGS. 1 and 2, for instance, the controller 20 receives a desired frequency or motor speed value of $\omega^*_{target}$ 21 (in units of radian per second or, equivalently, $f^*_{target}$ in units of Hz) from a supervisory control system component (not shown), which may be a distributed control system (DCS) element, a user-adjustable knob, local user interface, etc. The controller 20, moreover, includes a voltage command generator component 23, which can implement a velocity controller 32 as a voltage-frequency or current-frequency control component in certain non-limiting implementations, and which may implement a proportional-integral (PI) or other form of closed-loop control function in certain embodiments. As shown in FIG. 2, the velocity controller 32 receives an adjusted speed or frequency signal or value 31a from an adjustment component (e.g., summation component) 29 and provides current setpoint signals or values 32a in a d, q reference frame to a current controller 34, which in turn provides d, q voltage setpoint signals or values 34a to a d, q to a, b, c reference frame converter 36. The converter 36 provides voltage signals or values 37 $v_a^*$, $v_b^*$ and $v_c^*$ to a PWM component 38 for generating the inverter control signals 22. In addition, the current feedback is provided from the current sensors 27 to an a, b, c to d, q converter component 39 which provides d and q axis current signals 39a to the current controller 34. In this regard, the converters 36 and 39 perform the reference frame conversions according to a given position signal or value 25a provided by the commutation position calculator 25 ("θ"). In operation, the control components 32 and 34 are used to regulate the inverter output currents IA, IB and IC by providing the inverter switching control signals 22 according to the desired speed or frequency signal or value 21 and the current feedback signals or values 28.

In addition, the controller 20 implements the position calculator component 25, for example, in hardware, processor-executed software, programmable logic, etc., or combinations thereof, where the calculator 25 computes a commutation position signal or value 25a based on the desired speed signal or value 21 using an open loop position generator 41 or based on the inverter output current feedback signals or values $i_a$, $i_b$ and $i_c$ as well as on one or more voltage command signals or values 37 $v_a^*$, $v_b^*$ and $v_c^*$ (or measured output voltages sensed at the output of the sine wave filter 16 as shown in FIG. 2) using an EMF-based position estimator component 42.

In the illustrated embodiment, for example, the target speed 21 is provided to a rate limiter 30, which provides a rate limited desired speed signal or value $\omega^*_r$ to the summation component 29 and to an absolute value (ABS) component 47, whose output represents the absolute value of the rate limited desired speed ($|\omega^*_r|$). The output from the absolute value component 47 is provided as an input to a hysteresis component 48 to selectively set or reset a flag 49, in one example having a value of "0" for a first low speed range of operation and a value of "1" for operation in a higher second range. The use of the hysteresis component 48, in this regard, provides for some level of overlap between the first and second speed ranges, and facilitates operation without unnecessary transitioning back and forth between two operating modes for operation near the boundary of the ranges if separate. Thus, for example, the flag 49 ("Flag" in the figures) will transition from 0 to 1 when the absolute value exceeds a first threshold, and will transition back from 1 to 0 when the absolute value falls below a second, lower, threshold. In one possible implementation, for example, the flag 49 is set to 1 when the speed exceeds 15% of a rated value, and will be set back to 0 when the absolute value of the speed falls below 14% of the rated value, although any suitable first and second ranges and corresponding thresholds (e.g., with or without hysteresis) can be used to operate the controller 20 in a first mode for a first range of speeds or in a second mode for a second higher range of speeds.

The adjustment component 29 (e.g., summer) adjusts the frequency or speed setpoint value 21 based at least partially on a feedback signal or value 44a received from the position calculator 25. In the illustrated embodiments, the calculator 25 includes a selection component 44 providing the feedback signal or value 44a according to the state of the flag 49 from the hysteresis component 48, in one case to set the feedback signal or value 44a to a fixed value (e.g., zero in one example) for open loop control when the flag is 0 in the first mode for the first range of speeds. The calculator 25 otherwise sets the feedback signal or value 44a to an EMF-based speed estimate signal or value 43a obtained from a PLL velocity observer 43 according to an EMF-based position estimate 42a received from the EMF-based position estimator component 42. In this manner, low-speed operation is facilitated by saturation of the velocity controller 32 by using 0 (or other fixed value) for the velocity feedback, whereby the PI or other close loop control elements of the velocity PI controller 32 will drive the motor 6 through the current controller 34 to facilitate startup or low speed operation, whereupon transition to the second mode (flag=1) utilizes the EMF-based speed estimate signal or value $\hat{\omega}_{EMF}$ 43a to attain the desired. (e.g., rate limited) speed signal or value 21 $\omega^*_r$ for higher speed closed-loop operation in the second mode. The EMF-based position estimator component 42 in one embodiment is implemented using concepts set forth in the paper Rotor Position Estimation for Synchronous Machines Based on Equivalent EMF by Jingbo Liu et al., IEEE Transactions on Industry Applications, Vol. 47, no. 3, May/June 2011, incorporated herein by reference in its entirety. In addition, as shown in FIG. 2, the EMF-based position estimate signal or value $\hat{\theta}_{r\_EMF}$ 42a is provided as a preset input to the open loop position generator component 41 for presetting an integrator thereof for transitions from the second mode to the first mode. As previously noted, the conversion components 36 and 39 operate according to a given commutation position signal or value 25a θ provided by the position calculator component 25. As seen in FIG. 2, the position calculator 25 includes another selection component 45 operative when the flag is 0 to provide the given commutation position signal or value 25a as an open loop position signal or value $\theta_{OL}$ 41a from the open loop position generator component 41 in the first mode for low-speed operation, or as an estimated position signal or value 42a ($\hat{\theta}_{r\_EMF}$) in the second mode when the flag is 1 for higher speed operation. The open loop position generator component 41 provides the open loop position signal or value 41a from the commanded frequency value 46a and optionally at least partially according to inverter output current signals or values, in this case a and P reference frame signals or values $i_\alpha$ and $i_\beta$ from a converter component 50, and according to voltage signals $v^*_\alpha$ and $v^*_\beta$ from a converter component 51. The stationary reference frame converter components 50 and 51 convert the current feedback signals 28 and the voltage command (or voltage feedback) signals or values 37 from the a, b, c reference frame to a stationary "α,β" reference frame according to known transformation techniques, and the converters 36 and 39 and the voltage command generator component 23 provide conversion between the a, b, c reference frame and the stationary d, q reference frame according to known transformation techniques.

Figure 3:
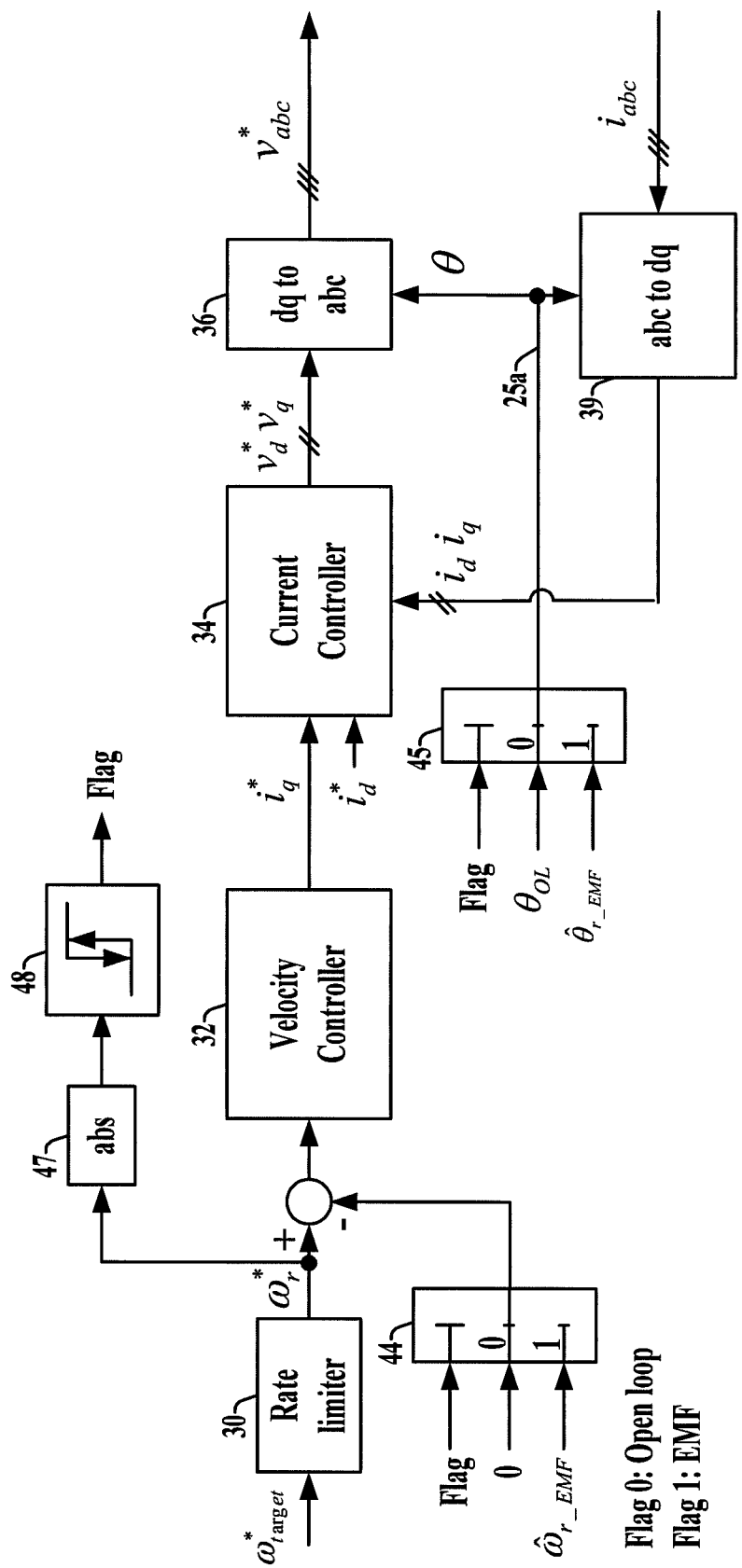
FIG. 3 is a schematic diagram illustrating a first transition embodiment for low-speed to high-speed transition of the position estimate.
Figure 4:
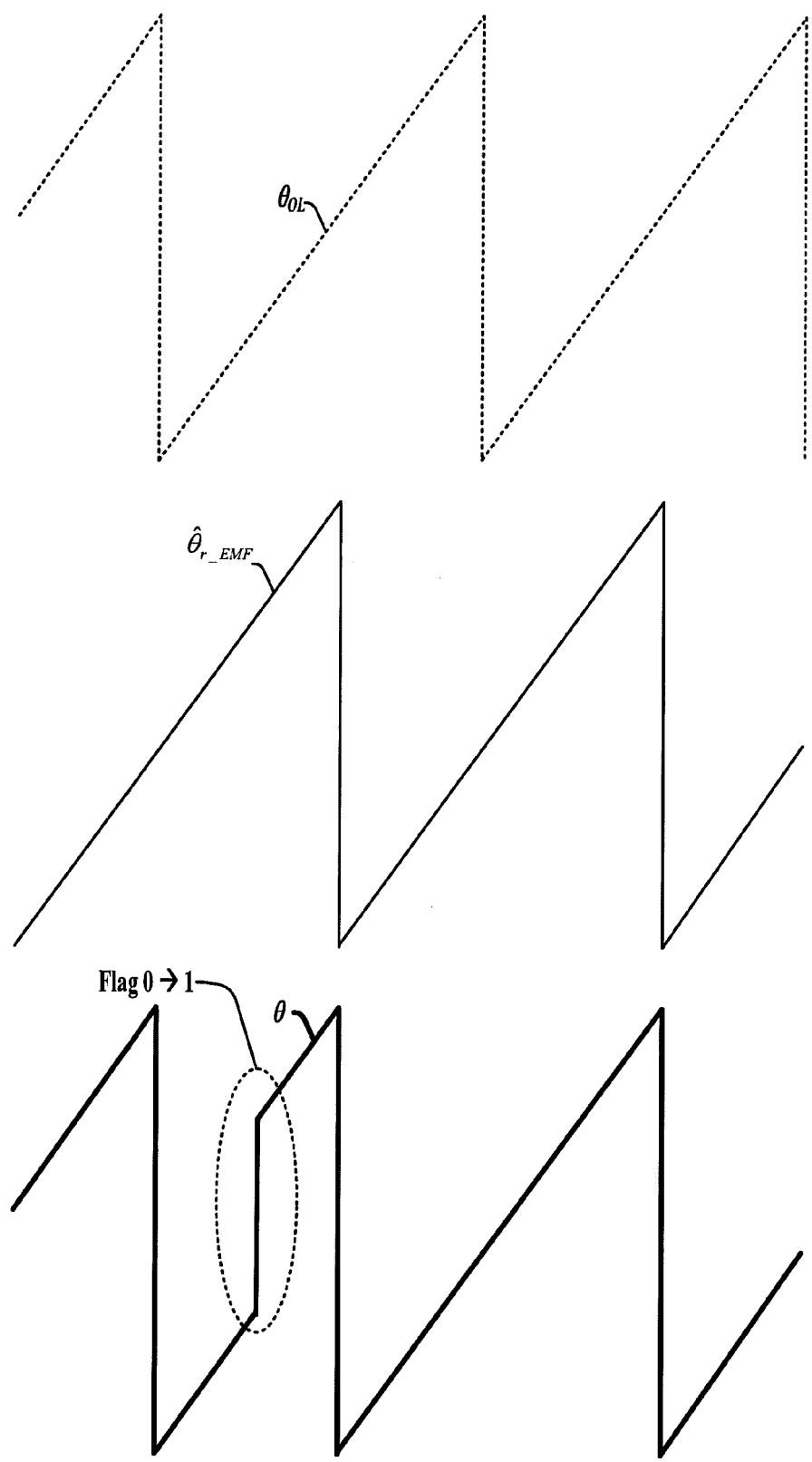
FIG. 4 is a graph showing example open loop and EMF-based positions and a commutation position showing transition from low-speed operation to high-speed operation in the first transition embodiment of FIG. 3.
Figure 5:
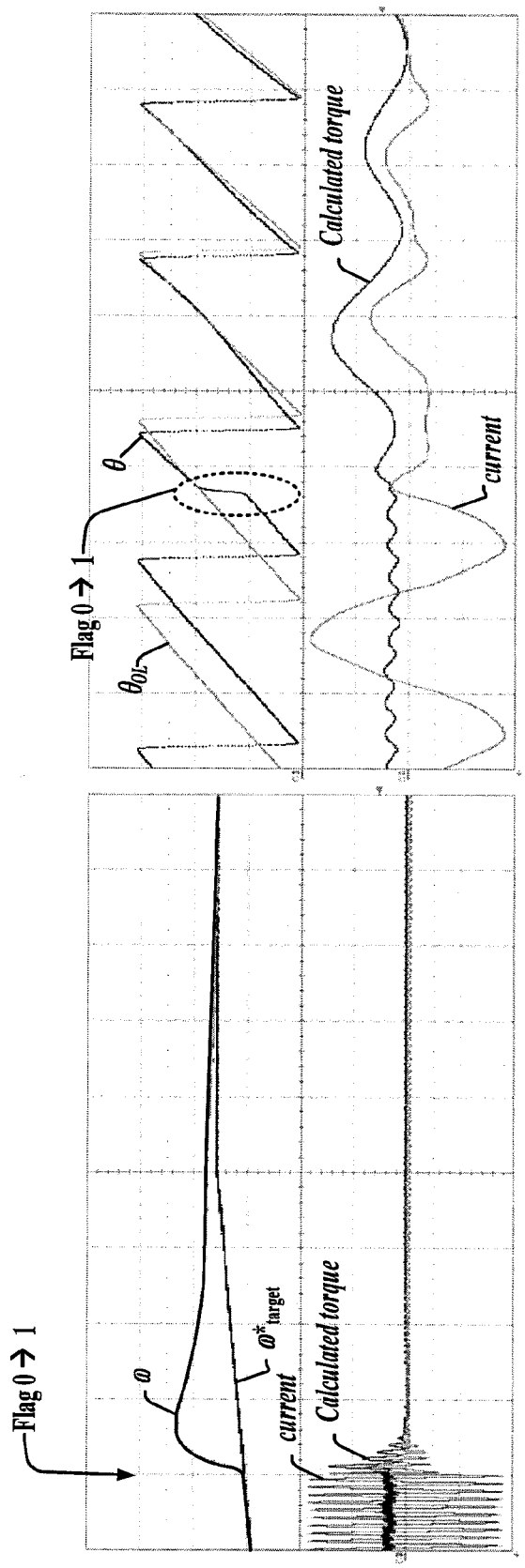
FIG. 5 is a graph illustrating speed, current, calculated torque and position signals or values in the first transition embodiment of FIGS. 3 and 4.

Referring also to FIGS. 3-5, a first transition embodiment is illustrated for switching from low-speed to high-speed operation, in which the selection component 45 simply changes the given commutation position signal or value 25a from the open loop value to the EMF-based value when the flag transitions from 0 to 1 as shown in FIG. 3. FIG. 4 illustrates graphs of the first (e.g., open loop) position $\theta_{OL}$ 41a from the open loop position generator component 41, the EMF-based position estimate $\hat{\theta}_{r\_EMF}$ 42a from the EMF-based estimator component 42, and the given commutation position signal or value θ 25a provided from the selection component 45, which undergoes a step change (increasing in the illustrated example) at the noted transition of the flag from 0 to 1. FIG. 5 illustrates motor speed, current, calculated torque and position signals or values in the first transition embodiment of FIGS. 3 and 4, in which the motor speed ω somewhat overshoots the target speed or velocity value $\omega^*_{target}$ after the flag transition, and the given position signal or value θ 25a undergoes a step change at the flag transition similar to the graph of FIG. 4.

Figure 6:
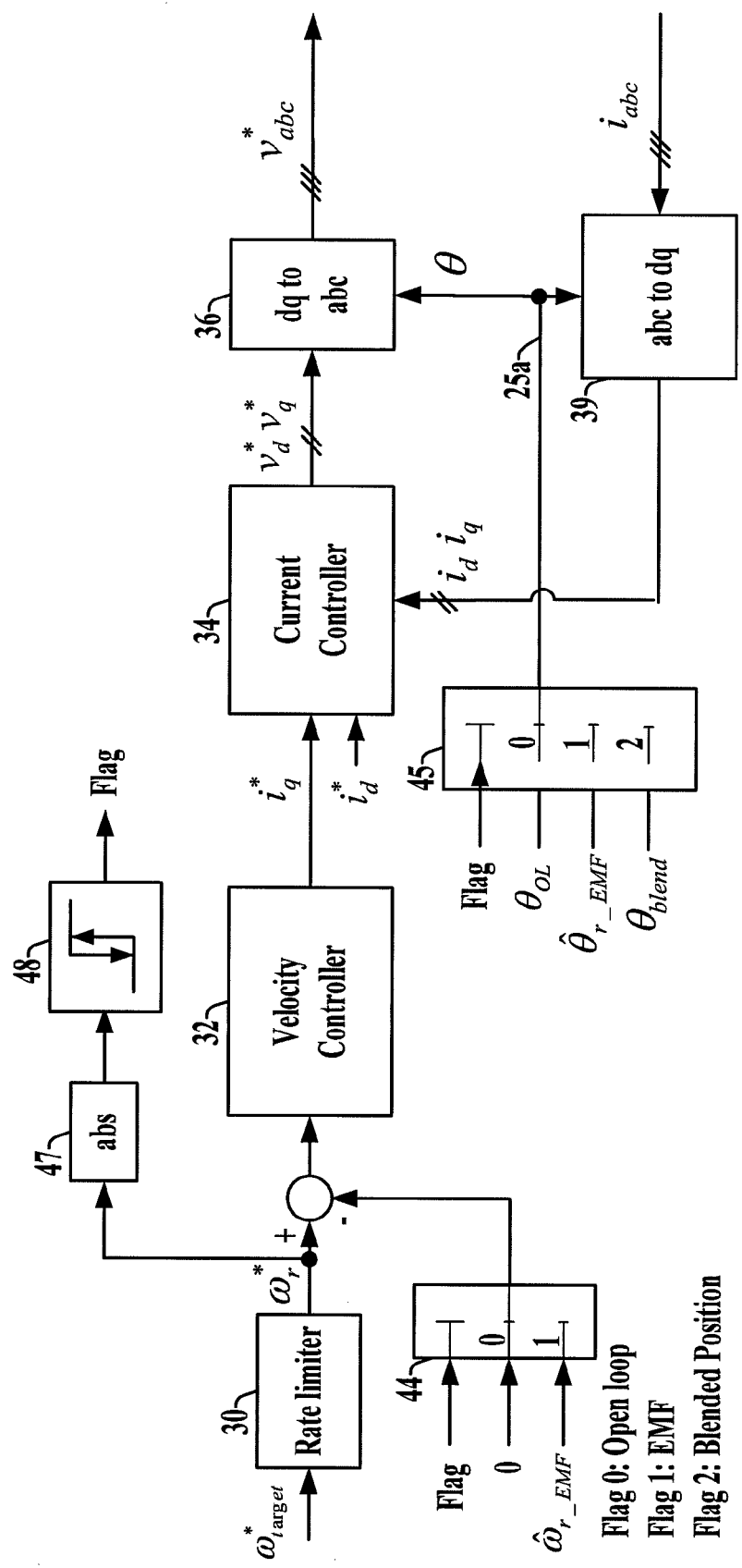
FIG. 6 is a schematic diagram illustrating a second transition embodiment for low-speed to high-speed transition of the position estimate using blending of the open loop position and the EMF-based position estimate.
Figure 7:
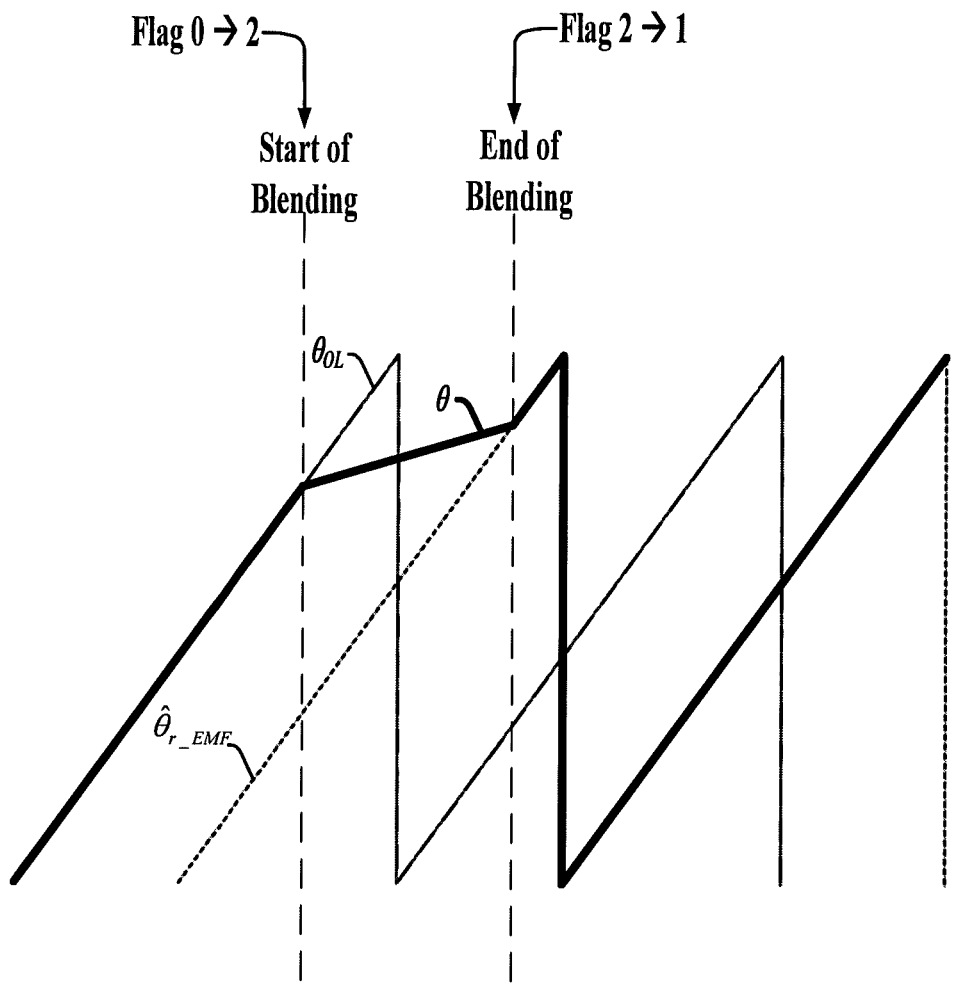
FIG. 7 is a graph showing example open loop and EMF-based positions and a commutation position showing blended transition from low-speed operation to high-speed operation in the second transition embodiment of FIG. 6.

Referring now to FIGS. 6 and 7, in another possible transition embodiment for changing operation from the first mode to the second mode, the controller 20 blends the open loop and estimated position signals or values to compute the selected position signal or value 25a, in this case providing the Flag in one of three states (0, 1 or 2). In this embodiment, upper transitions in speed from a flag value of 0 cause the Flag to assume a "2" state in which the controller 20 provides a smooth transition of the selected position signal or value 25a based on the open loop and estimated position signals or values 41a and 42a. The controller 20, in this regard, can implement any suitable smoothing algorithm, for example, as shown in FIG. 7 during a blending period beginning with the transition of the Flag from 0 to 2, with the position signal or value 25a (θ) gradually ramping from the initial open loop value $\theta_{OL}$ 41a to assume the EMF-based signal or value level $\hat{\theta}_{r\_EMF}$ 42a at the end of the blending period, where the blending period can be any suitable duration, for example, about 50 ms or other fraction of the fundamental period of the inverter output signals in certain non-limiting embodiments.

Figure 8:
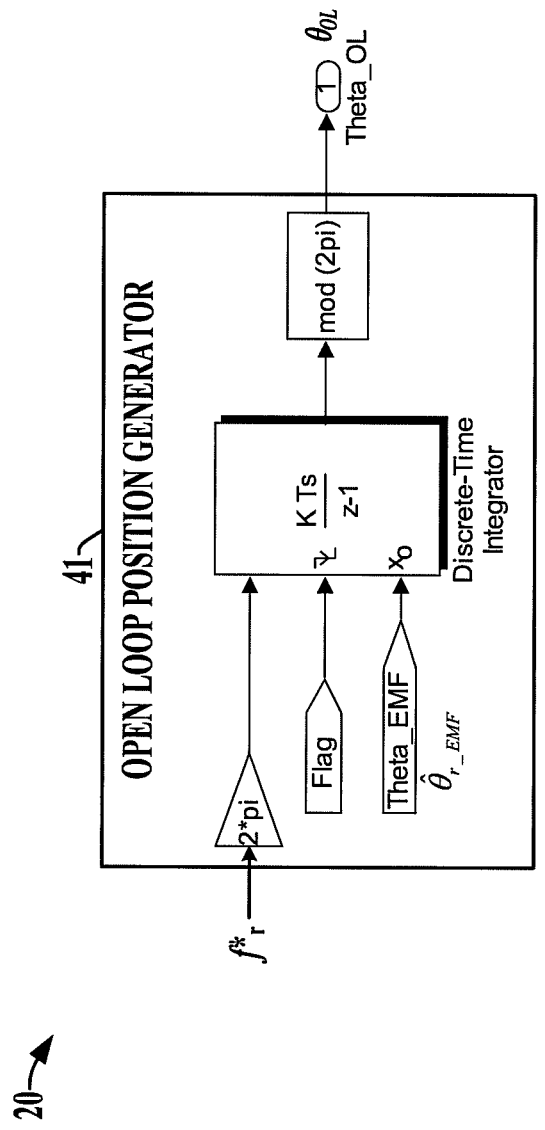
FIG. 8 is a partial schematic diagram illustrating further details of an open loop current regulated control embodiment providing open loop position signals or values preset from the EMF-based estimate value for transitioning from high-speed to low-speed operation.
Figure 9:
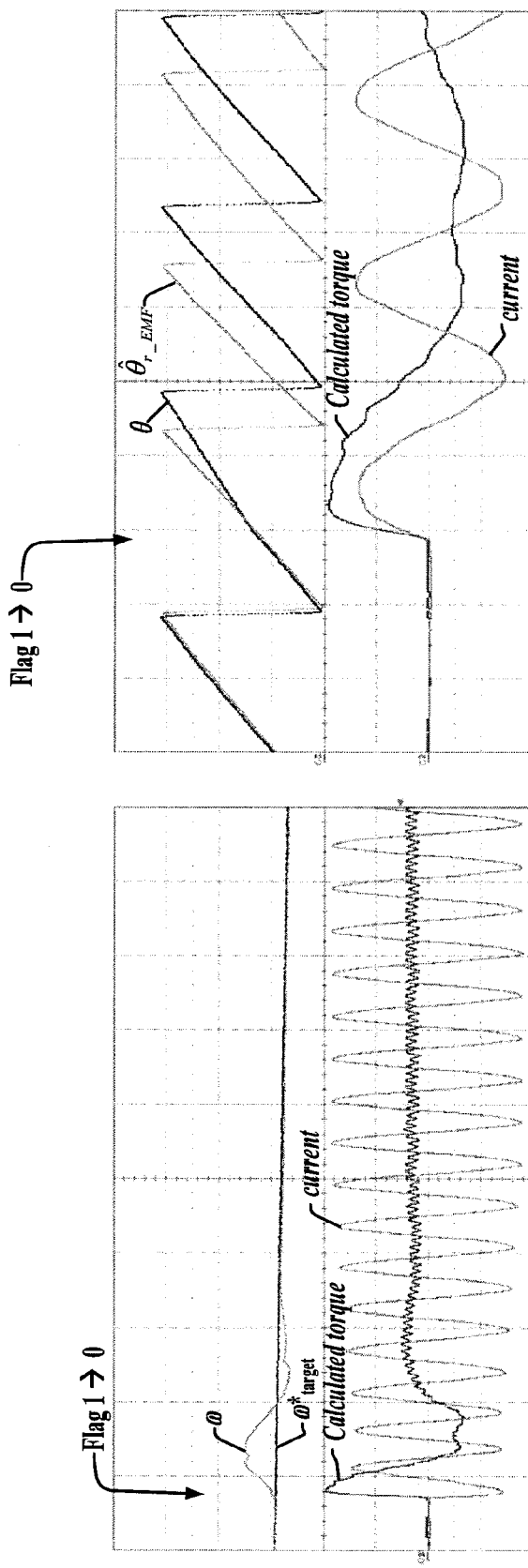
FIG. 9 is a graph illustrating speed, current, calculated torque and position signals or values for transitioning from high-speed to low-speed operation using the apparatus of FIG. 8.

FIGS. 8 and 9 illustrate an open loop control embodiment providing open loop position signals or values preset from the EMF-based estimate value for transitioning from high-speed to low-speed operation (e.g., Flag transitioning from 1 back to 0), with the graph of FIG. 9 illustrating motor speed, current, calculated torque and position signals or values for this transition. As shown in FIG. 8, the open loop position generator component 41 in one embodiment includes a discrete time integrator operative in the first mode to generate the open loop position signal or value $\theta_{OL}$ 41a based on the rate limited frequency or speed signal or value 46a, in this case being triggered or reset by a low going transition of the Flag signal 49 from the voltage command generator 23. In this embodiment, in order to mitigate abrupt transitions in the position signal or value θ 25a for decreasing speeds, the controller advantageously presets the discrete time integrator of the open loop position generator component 41 with the estimated position signal or value $\hat{\theta}_{r\_EMF}$ 42a from the EMF-based position estimator 42 prior to activation of the selection component 45 such that the integrator begins operation at the current output value from the EMF-based estimator 42. As seen in FIG. 9, the motor speed ω initially overshoots the target value after the transition of the Flag signal 49 from 1 to 0, and eventually settles, with the transition of the commutation position signal or value θ 25a beginning from the EMF-based value $\hat{\theta}_{r\_EMF}$ 42a at the flag transition, and thereafter deviating therefrom based on the value computed by the open loop position generator component 41.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for sensorless motor speed control in a motor drive having an inverter, the method comprising:
   generating a first position signal or value from a desired frequency or motor speed signal or value;
   generating a second position signal or value using an EMF-based position estimator according to inverter output current signals or values and inverter output voltage signals or values;
   generating voltage command signals or values for pulse width modulation operation of the inverter using a speed controller according to a desired speed signal or value, a feedback speed signal or value, and a selected commutation position signal or value;
   setting the selected commutation position signal or value to the first position signal or value in a first mode for a first range of speeds or to the second position signal or value in a second mode for a second higher range of speeds according to the desired speed signal or value;
   setting the feedback speed signal or value to a fixed value for open loop control in the first mode for the first range of speeds; and
   computing the feedback speed signal or value according to the second position signal or value for closed loop control in the second mode for the second range of speeds.

2. The method of claim 1, comprising presetting an integrator of a position generator according to the second position signal or value for transitioning from the second mode to the first mode.

3. The method of claim 2, wherein the fixed value is zero.

4. The method of claim 1, wherein the fixed value is zero.

5. A method for sensorless motor speed control in a motor drive having an inverter, the method comprising:
   generating a first position signal or value from a desired frequency or motor speed signal or value;
   generating a second position signal or value using an EMF-based position estimator according to inverter output current signals or values and inverter output voltage signals or values;
   generating voltage command signals or values for pulse width modulation operation of the inverter using a speed controller according to a desired speed signal or value, a feedback speed signal or value, and a selected commutation position signal or value;
   setting the selected commutation position signal or value to the first position signal or value in a first mode for a first range of speeds or to the second position signal or value in a second mode for a second higher range of speeds according to the desired speed signal or value;
   setting the feedback speed signal or value to a fixed value for open loop control in the first mode for the first range of speeds; and
   computing the feedback speed signal or value according to the second position signal or value for closed loop control in the second mode for the second range of speeds;
   wherein the first range and the second range overlap, the method comprising switching from the first mode to the second mode when an absolute value of the desired speed signal or value exceeds a first threshold, and switching from the second mode to the first mode when the absolute value of the desired speed signal or value is less than a second threshold, the second threshold being lower than the first threshold.

6. The method of claim 5, comprising blending the first and second position signals or values to compute the selected commutation position signal or value for transitioning from the first mode to the second mode.

7. The method of claim 6, wherein the first and second position signals or values are blended to provide a smooth transition of the selected commutation position signal or value.

8. The method of claim 6, comprising presetting an integrator of a first position generator according to the second position signal or value for transitioning from the second mode to the first mode.

9. The method of claim 8, wherein the fixed value is zero.

10. The method of claim 6, wherein the fixed value is zero.

11. The method of claim 5, comprising presetting an integrator of a position generator according to the second position signal or value for transitioning from the second mode to the first mode.

12. The method of claim 11, wherein the fixed value is zero.

13. The method of claim 5, wherein the fixed value is zero.

14. A method for sensorless motor speed control in a motor drive having an inverter, the method comprising:
   generating a first position signal or value from a desired frequency or motor speed signal or value;
   generating a second position signal or value using an EMF-based position estimator according to inverter output current signals or values and inverter output voltage signals or values;
   generating voltage command signals or values for pulse width modulation operation of the inverter using a speed controller according to a desired speed signal or value, a feedback speed signal or value, and a selected commutation position signal or value;
   setting the selected commutation position signal or value to the first position signal or value in a first mode for a first range of speeds or to the second position signal or value in a second mode for a second higher range of speeds according to the desired speed signal or value;

setting the feedback speed signal or value to a fixed value for open loop control in the first mode for the first range of speeds;

computing the feedback speed signal or value according to the second position signal or value for closed loop control in the second mode for the second range of speeds; and blending the first and second position signals or values to compute the selected commutation position signal or value for transitioning from the first mode to the second mode.

15. The method of claim 14, wherein the first and second position signals or values are blended to provide a smooth transition of the selected commutation position signal or value.

16. The method of claim 15, comprising presetting an integrator of a position generator according to the second position signal or value for transitioning from the second mode to the first mode.

17. The method of claim 16, wherein the fixed value is zero.

18. A motor drive controller, comprising:

at least one processor operatively coupled with an electronic memory;

a position calculation component implemented using the at least one processor and operative to generate a first position signal or value using a position generator implemented using the at least one processor according to a desired frequency or motor speed signal or value, the position generator being operative to generate a second position signal or value using an EMF-based position estimator implemented using the at least one processor according to inverter output current signals or values and inverter output voltage signals or values; and a command generator component implemented using the at least one processor and operative to generate voltage command signals or values for pulse width modulation operation of an inverter using a speed controller according to a desired speed signal or value, a feedback speed signal or value, and a selected commutation position signal or value;

wherein the position calculation component is operative to set the selected commutation position signal or value to the first position signal or value in a first mode for a first range of speeds or to the second position signal or value in a second mode for a second higher range of speeds according to the desired speed signal or value;

wherein the command generator component is operative to set the feedback speed signal or value to a fixed value for open loop control in the first mode for the first range of speeds; and wherein the command generator component is operative to compute the feedback speed signal or value according to the second position signal or value for closed loop control in the second mode for the second range of speeds.

19. The controller of claim 18, wherein the first range and the second range overlap, and wherein the command generator component is operative to switch from the first mode to the second mode when an absolute value of the desired speed signal or value exceeds a first threshold, and to switch from the second mode to the first mode when the absolute value of the desired speed signal or value is less than a second threshold, the second threshold being lower than the first threshold.

20. The controller of claim 18, wherein the position calculation component is operative to blend the first and second position signals or values to compute the selected commutation position signal or value for transitioning from the first mode to the second mode.

* * * * *